No. 727,088. PATENTED MAY 5, 1903.
C. P. CARLSON.
APPARATUS FOR RETAINING SODA-ASH DUST.
APPLICATION FILED DEC. 15, 1902.
NO MODEL.
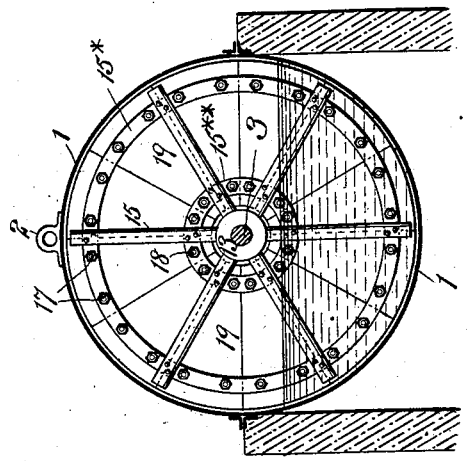
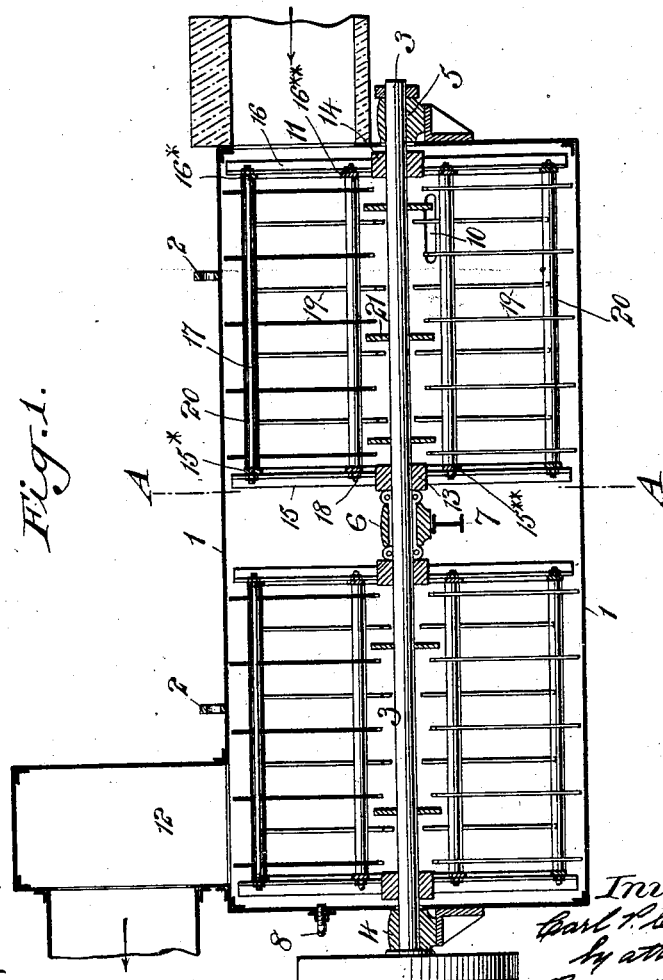
Witnesses:
George Barry Jr
Henry Thieme
Inventor
Carl P. Carlson,
by attorneys No. 727,088.

Patented May 5, 1903.

UNITED STATES PATENT OFFICE.

CARL P. CARLSON, OF LÅNGBRON, DINGELVIK, SWEDEN, ASSIGNOR TO ADOLF W. WAERN, OF BROOKLYN, NEW YORK.

APPARATUS FOR RETAINING SODA-ASH DUST.

SPECIFICATION forming part of Letters Patent No. 727,088, dated May 5, 1903.

Application filed December 15, 1902. Serial No. 135,176. (No model.)

*To all whom it may concern:*

Be it known that I, CARL P. CARLSON, a subject of the King of Sweden and Norway, and a resident of Långbron, Dingelvik, Sweden, have invented a new and useful Apparatus for Retaining Soda-Ash Dust, of which the following is a specification.

This invention consists of an apparatus for retaining soda-ash dust, the operation being to provide an apparatus through which the gases from soda-ash furnaces in soda-pulp works may pass, which gases carry with them a considerable amount of soda-ash dust up through the chimney, which soda-ash dust is usually lost. This apparatus comprises a tank adapted to contain a lye solution, which tank is fitted to permit the passage therethrough of the gases containing the soda-ash dust as the gases pass from the boiler of a soda-ash furnace to the chimney. Within the tank is located one or more baffle-plates arranged to be alternately dipped into the lye solution and brought into the path of the gases for deflecting the gases and collecting the soda-ash dust. I further provide means for maintaining a circulation of lye solution through the tank by feeding weak lye into one end thereof and permitting the concentrated lye to pass out near the opposite end thereof, the lye solution being in the meantime subject to the heat of the gases passing from the soda-ash furnace to the chimney for causing a rapid evaporation of the water in the lye solution. If an economizer is employed, this apparatus is placed between the economizer and the chimney.

A practical embodiment of my invention is represented in the accompanying drawings, in which—

Figure 1 represents the apparatus in vertical central section from front to rear therethrough. Fig. 2 is a transverse section taken in the plane of the line A A of Fig. 1.

A hollow cylinder or tank 1 forms a reservoir for the reception in its lower half of a lye solution. This cylinder is divided in half longitudinally, and the upper half is provided on its exterior with handles 2, whereby the upper half of the cylinder may be removed for obtaining access to the interior thereof. A rotary shaft 3 extends lengthwise through the center of the cylinder 1, which shaft is mounted in suitable bearings 4 and 5 beyond the ends of the said cylinder. This shaft 3 may be rotated by any desired driving mechanism. (Not shown herein.) To steady and support the shaft intermediate its ends, I provide a third bearing 6, supported by a cross-beam 7 about midway the length of the tank 1.

The tank 1, near one end thereof, is provided with an inlet 8, whereby a weak solution of lye may be fed into the interior of the tank. The tank 1 is provided at its other end with a surface outlet 10, through which the concentrated lye may pass out from within the tank, which concentrated lye may be fed to the soda-furnace. (Not shown herein.) The tank 1 is further provided in its upper section through its rear end with an inlet 11 for the gases containing the soda-ash dust from the soda-ash furnace or economizer, as the case may be. The upper section of the tank is provided at its front end with an outlet 12 for the gases, which outlet may be connected to a chimney (not shown herein) for permitting the escape of the gases after the soda-ash dust has been removed therefrom.

I provide one or more baffle-plates within the tank 1, arranged to be alternately dipped into the lye solution and brought into the path of the gases containing the soda-ash dust for collecting the soda-ash dust. The means which I employ in the present instance is constructed and arranged as follows: The two rotary frameworks are secured to revolve with the shaft 3 within the tank 1 upon opposite sides of the center bearing 6 of the said shaft. As these two frameworks are the same in construction, I will proceed to describe one only of the same. Collars 13 and 14 are fixed to the shaft 3, and from the collar 13 a plurality of arms 15 radiate. A similar plurality of arms 16 radiate from the collar 14. A pair of rings 15* 15** are secured to the radiating arms 15 concentric with the shaft 3, and two rings 16* 16** are secured to the radiating arm 16 concentric with the said shaft 3. Stay-rods 17 connect the outer rings 15* 16*, and stay-rods 18 connect the inner rings 15 16. To give strength to the framework, the arms 15 and 16 are preferably made of angle-iron construction. A plurality of longitudinal series of baffle-plates 19 are arranged in zigzag order between the arms 15 and 16, which baffle-plates are supported by the stay-rods 17 and 18 and are spaced apart by sleeves or tubes 20, located upon the stay-rods 17 and 18. The plates 19 of one longitudinal series alternate with the plates of the adjacent longitudinal series, the adjacent edges of the said plates being substantially in line with each other, so as to cause the gases to pass from the inlet to the outlet end of the tank through tortuous paths. Center plates 21 are carried by the shaft 3 to prevent the free passage of the gases along the space adjacent to the shaft between the inner ends of the baffle-plates 19.

The operation of the apparatus is as follows: The frameworks carrying the alternating baffle-plates are slowly revolved within the tank, thus alternately dipping the plates into the lye solution and then bringing the plates up into the path of the gases containing the soda-ash dust. As the gases are forced to pass in a tortuous path by the baffle-plates, the soda-ash dust which is carried along by the gases is caused to adhere to the plates, and as the plates are dipped in the lye solution the dust is dissolved in the lye at the bottom of the cylinder or tank. As the gases are hot, a considerable evaporation of water from the lye solution within the tank takes place. A constant circulation of the lye solution is obtained within the tank by feeding weak lye constantly through the inlet 1 and permitting the concentrated lye to escape through the surface outlet 10. The amount of weak lye admitted through the inlet 1 may be regulated, so as to give the right concentration of the lye running out through the outlet 10 to the soda-ash furnace.

In case the draft in the chimney is poor it may be necessary to put in a blower between the apparatus and chimney to overcome the resistance in the apparatus. This blower is not shown herein, as it forms no part of the present invention.

The apparatus described herein permits a considerable saving of soda-ash, as the dust which escapes from the furnace or economizer is usually a total loss, as it passes up the chimney with the gases. The heat of the gases is also utilized for concentrating the lye within the tank to bring it to the proper point to be fed to the soda-ash furnace.

What I claim is—

1. The combination with a tank arranged to permit the passage therethrough of gases containing soda-ash dust and adapted to contain a lye solution, of a rotary shaft, imperforate baffle-plates carried thereby arranged in staggered order to cause the gases to pass through the tank around the said plates in tortuous paths and means for alternately dipping the baffle-plates into the lye solution and bringing them into the path of the gases for collecting the soda-ash dust thereon and conveying it into the solution.

2. The combination with a tank arranged to permit the passage therethrough of gases containing soda-ash dust and adapted to contain a lye solution, of a rotary shaft, imperforate baffle-plates carried thereby arranged in longitudinal series, the plates of one series being arranged in staggered order with the plates of the adjacent series to cause the gases to be deflected and pass through the tank around the said plates in tortuous paths and means for alternately dipping the several series of plates into the solution and bringing them into the path of the gases for collecting the soda-ash dust thereon and conveying it into the solution.

3. The combination with a tank arranged to permit the passage therethrough of gases containing soda-ash dust and adapted to contain a lye solution, of a rotary shaft extending through the tank, a framework carried by the shaft comprising a plurality of pairs of radiating arms, inner and outer concentric rings secured to the arms, stay-rods connecting the rings and longitudinal series of baffle-plates carried by the said rods, the baffle-plates of one series being arranged in staggered order with respect to the baffle-plates of the adjacent series for causing the gases to pass through the tank in tortuous paths and means for alternately dipping each of the said series of plates into the lye solution and bringing them into the path of the gases for collecting the soda-ash dust thereon and conveying it into the solution.

In testimony that I claim the foregoing as my invention I have signed my name, in presence of two witnesses, this 28th day of May, 1902.

CARL P. CARLSON.

Witnesses:
PEDRO C. WAIN,
W. KJENGREN.